No. 679,102. Patented July 23, 1901.
E. J. BERG.
SYSTEM OF ELECTRICAL DISTRIBUTION.
(Application filed Jan. 2, 1901.)
(No Model.)

Witnesses
John Ellis Glenn
Benjamin B Hull

Inventor:
Ernst J. Berg,
by Albert G. Davis
Atty.

UNITED STATES PATENT OFFICE.

ERNST J. BERG, OF SCHENECTADY, NEW YORK, ASSIGNOR TO GENERAL ELECTRIC COMPANY, OF NEW YORK.

SYSTEM OF ELECTRICAL DISTRIBUTION.

SPECIFICATION forming part of Letters Patent No. 679,102, dated July 23, 1901.

Application filed January 2, 1901. Serial No. 41,816. (No model.)

*To all whom it may concern:*

Be it known that I, ERNST J. BERG, a citizen of the United States, residing at Schenectady, county of Schenectady, State of New York, have invented certain new and useful Improvements in Systems of Electrical Distribution, (Case No. 1,603,) of which the following is a specification.

My present invention relates to certain improvements in devices for transforming alternating current at constant potential into alternating current at constant volume, or the reverse.

In carrying out my invention I make use of reactances of opposite sign connected in series across the winding of a compensator or transformer or across any other device between points in which a constant alternating difference of potential is maintained. The reactance devices are proportioned so that at normal frequency in the alternating-current system the opposing voltages of the reactances will be equal to each other. With this relation between the reactances the voltage across the terminals of each is at right angles to that in the constant-potential-supply system. The voltages across each of the reactances may therefore be combined with each other and impressed on a consumption-circuit if the said circuit have one of its terminals joined to the common connection between two of the reactances of opposite sign and its other terminal to a point in the compensator or other winding midway between the points of connection thereto of the reactances. The consumption-circuit will then carry a constant current. This arrangement of transforming apparatus possesses various advantages, which, together with other features of the invention, will be set forth more at length in the following description, taken in connection with the accompanying drawings, in which—

Figure 1:
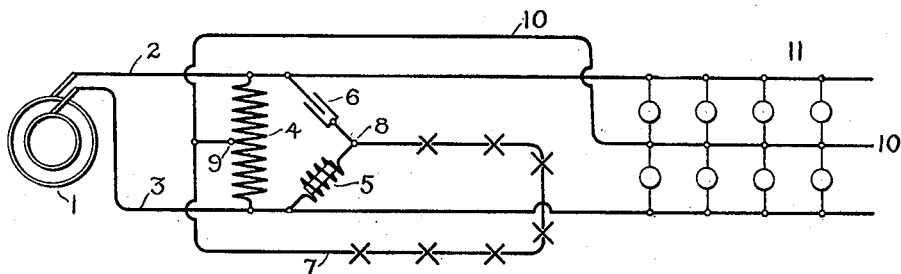
Figure 2:
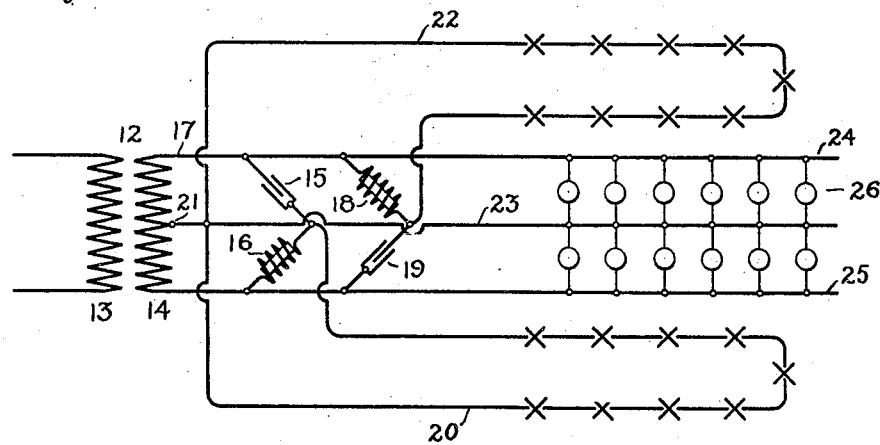

Figure 1 represents one embodiment of my invention, and Fig. 2 a different arrangement.

In Fig. 1 a source of alternating current of constant potential is indicated conventionally at 1. From the terminals of this source lead mains 2 and 3, which supply current to translating devices of any desired character. I have in this instance shown a compensator 4 connected across these mains. In operative relation to this compensator I have also shown two reactance devices of opposite sign, such as the inductance-coil 5 and the condenser 6, connected in series with each other between the mains 2 3, across which the compensator 4 is connected, as described. The inductance-coil 5 and the condenser 6 are proportioned so that when traversed by the same alternating current their voltages are equal in value, this being the relation necessary for resonance, as will readily be understood by those skilled in the art. A constant-current circuit 7 is connected to the junction 8 of the inductance-coil 5 and the condenser 6, respectively, and also to the middle point 9 of the compensator 4. The electromotive force impressed both by the condenser and by the inductance upon this circuit is in quadrature to the electromotive force between the terminals of the compensator 4. This compensator, therefore, has no effect on the voltage of the constant-current circuit, but affords merely a point of connection of one end of the circuit. This mode of connection, however, possesses certain important advantages. The condenser being connected, through the constant-current circuit, in shunt about one half of the compensator 4 causes a lagging wattless current to flow therein, while the inductance-coil 5, being similarly connected across the remaining half of the compensator, causes a leading wattless current to flow. The wattless currents thus flowing in the respective halves of the compensator neutralize each other so far as the constant-potential circuit 2 3 is concerned, due to which fact the power factor of the constant-potential circuit is not affected by the presence of these reactances. If the load upon the constant-current circuit is non-inductive, then the power factor of the constant-potential circuit will be unity. Obviously this is an important advantage. The middle point 9 of the compensator 4 may be connected through a main 10 to a three-wire distribution system, (indicated generally at 11,) in connection with which it becomes the neutral conductor.

Fig. 2 shows an extension of the arrangement shown in Fig. 1. In this case instead of employing a compensator I make use of a transformer 12. The primary winding, supplied with current at constant potential from any suitable source, is represented at 13, and the secondary at 14. Across this secondary winding I connect two sets of reactance devices, each set consisting of an inductance-coil and a condenser or other equivalent, the connections of one set being reversed with respect to the other. Thus the condenser 15 and the inductance-coil 16 are connected in series with each other, with the terminal of the condenser joined to the upper terminal 17 of the secondary 14, the free terminal of the inductance-coil being similarly connected to the lower terminal of the secondary. In a similar manner the second set of reactance devices, consisting of the inductance-coil 18 and the condenser 19, has the free terminal of the inductance-coil connected not to the lower terminal of the secondary, as is done with respect to the first set, but to the upper terminal 17, as shown, the free terminal of the condenser 19 being connected to the lower terminal of the secondary or, for that matter, to a main or conductor emanating therefrom. Each of these sets of reactance devices is connected with a constant-current circuit of its own, the circuit 20 being joined with one of its terminals to the junction of the condenser and inductance-coil, constituting the first set of reactance devices, and with its other terminal to the middle point 21 of the secondary 14. The second constant-current circuit 22 is similarly connected with one of its terminals to the junction of the condenser 19 and inductance-coil 18, constituting the second set of reactances, and with its other terminal to the middle point 21 of the secondary winding 14. A neutral conductor 23 may also be connected to this middle point of the secondary 14 and may coöperate with the mains 24 and 25, extending therefrom, to constitute a three-wire-distribution system, (indicated generally at 26.) By thus connecting two sets of reactances in reverse relation to the constant-potential winding or other device to which the constant current is connected I obtain the important advantage that the wattless currents due to one set of reactance devices are compensated for to a greater or less extent by the wattless currents due to the other set. This of course does not alter the phase relations in the constant-potential-supply circuit, but it does eliminate wattless currents which would otherwise flow in the compensator or transformer windings, thereby decreasing the waste of energy and so increasing the efficiency of the transforming system.

In the above I have described the invention as connected for transforming current at constant potential into current at constant volume; but it will be obvious that the reverse transformation may be effected without departing from the spirit of my invention, the only change necessary being that current at constant volume be supplied from a suitable generating source to the constant-current circuit or circuits, a constant alternating potential being thereby generated in the constant-potential system, as will be evident.

Wherever herein I speak of "reactances of opposite sign," I mean to include devices which possess the effect of capacity and inductance, respectively. For the purpose of illustration I have shown a condenser as typifying a device possessing capacity and an inductance-coil as typifying a device possessing inductance; but it will be evident to those skilled in the art that other devices possessing these same qualities may be employed—such, for example, as polarization-cells, transformers with open magnetic circuits, transformers with condensers in their secondaries, &c.

What I claim as new, and desire to secure by Letters Patent of the United States, is—

1. The combination of a device across which a constant difference of potential is maintained, reactances of different sign connected in series across said device, and a consumption-circuit connected between the junction of said reactances and a point between the terminals of said device.

2. The combination of a winding, constant-potential mains extending therefrom, reactances of different sign connected in series across points in said winding, and a constant-current circuit connected between the junction of said reactances and a point in said winding.

3. The combination of a winding constituting the seat of an alternating difference of potential, reactances of opposite sign connected in series across said winding, and a circuit connected between the middle point of said winding and the junction of said reactances.

4. The combination of a winding constituting the seat of a constant alternating electromotive force, reactances of opposite sign connected in series across points in said winding, and a circuit connected between an intermediate point of said winding and the junction of said reactances.

5. The combination of a winding constituting the seat of an alternating electromotive force, reactances of opposite sign connected in series across points in said winding, and a circuit connected between an intermediate point of said winding and the junction of said reactances.

6. The combination of a winding forming the seat of an alternating difference of potential, a condenser and an inductance connected in series across said winding, and a consumption-circuit connected between an intermediate point of said winding and the junction between said condenser and said inductance.

7. The combination of a winding, constant-potential mains extending therefrom, another main extending from a point in said winding and coöperating with said constant-potential mains to form a multiple-conductor system, reactances of different sign connected in series across points in said winding, and a constant-current circuit connected between the junction of said reactances and a point in said winding.

8. The combination of a winding forming the seat of an alternating difference of potential, reactances of opposite sign connected in series across said winding, another set of reactances of opposite sign connected in series across said winding but in reverse relation to the first set, and consumption-circuits connected between an intermediate point of said winding and the respective junctions between the reactances of each of said sets.

In witness whereof I have hereunto set my hand this 29th day of December, 1900.

ERNST J. BERG.

Witnesses:
BENJAMIN B. HULL,
FRED RUSS.